(12) United States Patent
Spano et al.

(10) Patent No.: US 7,350,815 B2
(45) Date of Patent: Apr. 1, 2008

(54) ADJUSTABLE STEERING COLUMN OF A MOTOR VEHICLE

(75) Inventors: Ilario Spano, Triesen (LI); Thomas Heuberger, Zuzwil (CH)

(73) Assignee: ThyssenKrupp Presta Aktiengesellschaft, Eschen (LI)

( * ) Notice: Subject to any disclaimer, the term of this patent is extended or adjusted under 35 U.S.C. 154(b) by 0 days.

(21) Appl. No.: 11/785,697

(22) Filed: Apr. 19, 2007

(65) Prior Publication Data

US 2007/0252372 A1    Nov. 1, 2007

Related U.S. Application Data

(63) Continuation of application No. PCT/EP2005/010060, filed on Sep. 16, 2005.

(30) Foreign Application Priority Data

Oct. 19, 2004    (DE) ...................... 10 2004 051 060

(51) Int. Cl.
*B62D 1/18*    (2006.01)
(52) U.S. Cl. .................................................... 280/775
(58) Field of Classification Search ................ 280/775, 280/777; 74/493
See application file for complete search history.

(56) References Cited

U.S. PATENT DOCUMENTS 5,524,927 A * 6/1996 Toussaint .................... 280/777
5,687,990 A    11/1997 Uphaus
6,761,376 B2 * 7/2004 Riefe et al. .................. 280/777

FOREIGN PATENT DOCUMENTS

DE    195 06 210    6/1996

\* cited by examiner

*Primary Examiner*—Paul N. Dickson
*Assistant Examiner*—Robert A. Coker
(74) *Attorney, Agent, or Firm*—Wenderoth, Lind & Ponack, L.L.P.

(57) ABSTRACT

An adjustable steering column including an adjusting part that can be displaced in at least one adjusting direction for adjusting the position of the steering column, a holding part which is fixed in the adjusting direction, a fixing device, in the opened state of which the adjusting part can be displaced in relation to the holding part for adjusting the position of the steering column, and in the closed state of which the adjusting part is fixed by the fixing device, and a crash blocking device by which, in the event of a crash, an additional holding force can be exerted against the displacement of the adjusting part in relation to the holding part, and which includes a gripping wedge that can be wedged into a gap between the adjusting part and the holding part in the event of a crash.

21 Claims, 11 Drawing Sheets

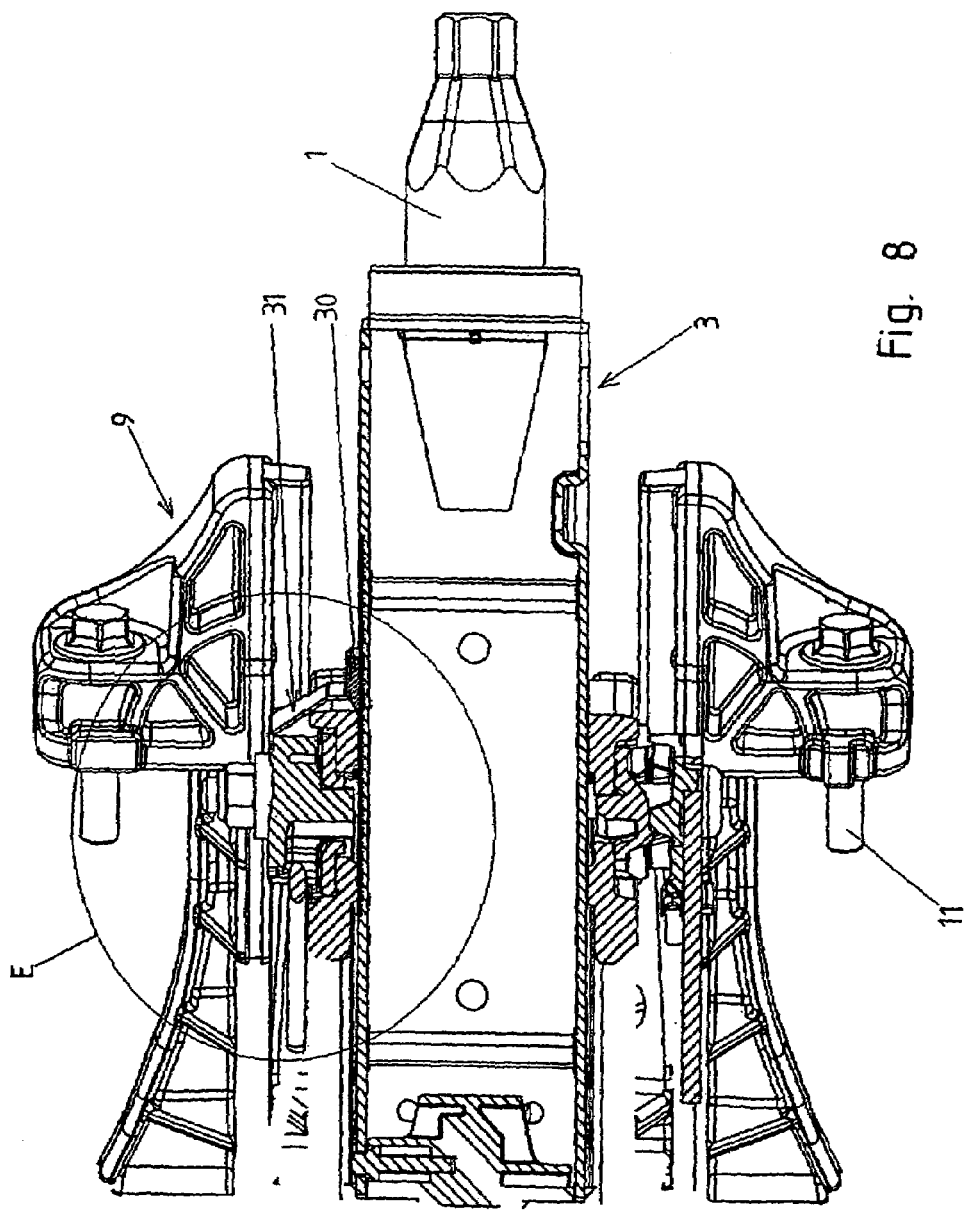

ADJUSTABLE STEERING COLUMN OF A MOTOR VEHICLE

This is a Continuation of PCT/EP2005/010060, filed Sep. 16, 2005

BACKGROUND OF THE INVENTION

The invention relates to an adjustable steering column for a motor vehicle with a setting part displaceable in at least one setting direction for setting the position of the steering column, a holding part nondisplaceable in this setting direction, a securement device, in the opened state of which the setting part is displaceable with respect to the holding part for setting the position of the steering column and, in the closed stage of which, the setting part is secured in place by the securement device, and a crash-blocking means, by which in the event of a crash an additional holding force against a dislocation of the setting part with respect to the holding part can be exerted and which comprises a clamping wedge, which, in the event of a crash, can be slid into a gap between the setting part and the holding part and be wedged in it.

Adjustable steering columns are known in different embodiments. The length of the steering column as well as also its inclination or height can conventionally be changed in the open state of a securement means. To fix the set position in the closed state of the securement means, intersecting disk packs may for example be provided of which the one is secured on the shell unit receiving the steering spindle and the other is secured on a support unit connected with the chassis. The intersecting disk packs are penetrated by a clamp bolt and mutually clamped by actuating a clamping lever. To permit displacement, in the disk packs as well as in the shell unit and in the support unit elongated holes are disposed through which the clamp bolt penetrates, the elongated holes intersecting one another for the axial adjustment of the steering column and for the height adjustment of the steering column. Such an adjustable steering column is disclosed for example in EP 0 802 104 B1.

A further adjustable steering column with a securement device implemented in the manner of a lamella stack is disclosed for example in U.S. Pat. No. 6,581,965 B2.

Known are further adjustable steering columns, in which the securement device comprises toothed parts, which, in the closed state of the securement device, mesh with one another and consequently block the axial displacement and height displacement of the steering column. Such a steering column is for example disclosed in EP 0 836 981 B1. In the event of a crash, in spite of the very high forces occurring, relative movements in the displacement mechanism of the steering column should as much as possible be excluded, inter alia in order for the air bag to be able to unfold its full effectiveness as an impact protection for the driver. The securement devices serving to secure the steering column in normal operation are conventionally not suited to absorb these high forces in the event of a crash, since their implementation would otherwise be highly complex and expensive and would require a great deal of installation space. For that reason steering columns have already been proposed which include additional crash blocking means, which, in the event of a crash exert an additional holding force against a dislocation of the shell unit with respect to the support unit. EP 1 044 127 B1 discloses for example to develop at the instance of impact of the motor vehicle onto a hindrance a positive locking connection between the shell unit and a chassis-stationary support unit through pyrotechnical means. Of disadvantage is the relatively complex implementation of such a steering column, wherein a sensor system for the acquisition of the impact and for triggering the pyrotechnical means is also required.

The adjustable steering column of DE 195 06 210 C1 comprises a blocking element with a blade edge which can be pressed onto a clamp flange during the closing of the securement device. In the event of a crash the blade edge of this blocking element digs into the material of the clamp flange in order to yield as much as possible a positive locking of the shell unit of the steering column with the vehicle body-stationary holding unit. Of disadvantage in such unit is that the reliable pressing-in of the blade edge into the material of the clamp flange, and consequently the positive locking, in continuous operation cannot be ensured with certainty in the even of a crash. Moreover, an increased closing force is required for closing the securement device.

An adjustable steering column of the type described in the introduction is disclosed in DE 196 17 561 C1. Herein a clamping wedge is displaceably supported on a shell tube rotatably supported on an axially displaceable part of the steering spindle, which wedge is acted upon by a spring into its passive position in a direction displaced with respect to the steering wheel. In the event of a crash, the acceleration force acting onto the clamping wedge effects a displacement of the clamping wedge acting independently of the securement device against the force of the spring, wherein the clamping wedge is driven into a gap between the shell tube and an axially nondisplaceable section of the steering spindle and consequently blocks the dislocation of the shell tube relative to the axially nondisplaceable steering spindle and thus also relative to a chassis-stationary holding part of the steering column. Such an implementation does not sufficiently ensure that the crash blocking means becomes reliably effective in the event of a crash. In addition to a clamping wedge, DE 196 17 561 C1 describes arresting parts also developed in different form, such as for example in the form of a retaining ball or pivot jaw. A sensor-controlled displacement device for conveying the arresting parts independent of the securement device into its effective position is also cited.

SUMMARY OF THE INVENTION

The invention addresses the problem of providing an adjustable steering column with a crash blocking means implemented simply and acting reliably, by which in the event of a crash an additional holding force can be exerted against a dislocation of the shell unit with respect to the support unit.

This is accomplished according to the invention through an adjustable steering column for a motor vehicle comprising a setting part displaceable in at least one setting direction for setting the position of the steering column, a holding part nondisplaceable in this setting direction, a securement device in the opened state of which the setting part is displaceable with respect to the holding part for setting the position of the steering column and in the closed state of which the setting part is fixed in place by the securement device, and a crash blocking means by which in the event of a crash an additional holding force against a dislocation of the setting part with respect to the holding part can be exerted and which comprises a clamping wedge which, in the event of a crash, can be slid into a gap between the setting part and the holding part and can be wedged in it, wherein the clamping wedge is connected with a part of the securement device moving during the opening and closing of the securement device, such that during the closing of the securement device a contact face of the clamping wedge can be placed in contact on a locating face of the setting part and, in the closed state of the securement device is with the locating face of the setting part in positive locking and/or frictional closure contact, wherein the clamping wedge in the event of a crash can be entrained by the setting part at an onsetting dislocation of the setting part with respect to the holding part and can be wedged in the gap between the setting part and the holding part, and during the opening of the securement device the contact face of the clamping wedge can be raised from the locating face of the setting part.

The clamping wedge consequently is displaced by the part connected with the clamping wedge of the securement device moving during the opening and closing between its passive position, in which it is raised from the locating face of the setting part, and a standby position in which it is in contact on the setting part. In this standby position the clamping wedge in the event of a crash with an onsetting displacement of the setting part with respect to the holding part is entrained by the setting part in the direction of this displacement and consequently reaches the state in which it is wedged in the gap between the setting part and the holding part. In the standby position of the clamping wedge there is sufficient entrainment action, for example by an entrainment force transmissible by the setting part onto this wedge, in order to entrain it in the event of a crash such that it becomes wedged in the gap between the setting part and the holding part. This is preferably attained through a positive locking connection between the clamping wedge and the locating face of the setting part in the state of the clamping wedge in which it is placed on the setting part. Instead of a positive locking connection, or in addition to it, a frictional closure connection may also be provided.

During the opening of the securement device the clamping wedge is raised by the part of the securement device moving during the opening and closing of the securement device, with which part the clamping wedge is connected, from the locating face of the setting part, such that with a displacement of the setting part with respect to the holding part it is not entrained by the setting part.

The part of the securement device moving during the opening and closing of the securement device, with which the clamping wedge is connected, is in particular a securement element of the securement device, which serves for securing the setting part with respect to the holding part when the securement device is in its closed state. This securement element moves during the opening and closing of the securement device in a displacement direction and the clamping wedge is entrained in this displacement direction when the securement device is opened and closed. Herein it is operatively interacting with the securement element, preferably via a support arm which is disposed on the securement element or on a part sliding jointly with it when the securement device is opened and closed. It would in principle be feasible and conceivable to connect the clamping wedge with another part of the securement device, which during the opening and closing of the securement device does not perform a movement in a displacement direction of a securement element, but rather a movement in another direction, the clamping wedge herein preferably again being connected via a support arm with this part of the securement device.

In an advantageous embodiment of the invention the clamping wedge is connected with a securement element in the form of a clamp jaw in the displacement direction of the clamp jaw during the opening and closing of the securement device, the clamp jaw being displaceable during the opening and closing in the axial direction of a clamp bolt of the securement device. The clamp bolt may herein also be displaceable in its axial direction during the opening and closing of the securement device and/or support the clamp jaw displaceably in the axial direction of the clamp bolt.

Motor vehicle steering columns are preferably settable in several setting directions. In one setting direction herein an axial adjustment (=length adjustment) of the steering column takes place, in another setting direction an inclination adjustment can take place which in the case of steering columns of passenger motor vehicles conventionally leads simultaneously to a height adjustment. It would also be conceivable and feasible to provide separate adjustments for height and/or inclination of the steering column.

The invented crash blocking means can advantageously be employed for blocking the axial displaceability (=length displaceability) of the steering column in the event of a crash. The height displacement or inclination displacement (in one or both directions) or a combination of several displacement directions can in this way be blocked in the event of a crash.

In an advantageous embodiment of the invention the setting part bearing-supports the steering spindle in a section adjoining its steering wheel-side end such that it is rotatable. Such a setting part at least partially encompassing the steering spindle is also referred to as shell tube.

The holding part may be connected directly or indirectly with the chassis of the motor vehicle. The holding part may for example be supported by a chassis-stationary console, with which it is nondisplaceably connected in normal operation and in the event of a crash is displaceably absorbing energy. Such implementations are known in different embodiments. For example holding strips, nonflexible or tearable in the event of a crash, may be disposed between the console and between the holding part.

Through the invented crash blocking means, in which the clamping wedge is coupled with the securement device, additional holding forces against a displacement in its displacement mechanism in the event of a crash are highly effectively provided and in the opened state of the securement device the capability of smooth-running of the adjustment of the steering column is not impaired.

In a steering column according to the invention the securement device may have different securement elements, for example toothings, lamellae or other frictional faces. The invention is not limited to specific securement elements of the securement device.

BRIEF DESCRIPTION OF THE DRAWINGS

Further advantages and details of the invention will be explained in the following in conjunction with the enclosed drawing. Therein depict.

DETAILED DESCRIPTION OF THE PREFERRED EMBODIMENTS

Figure 1:
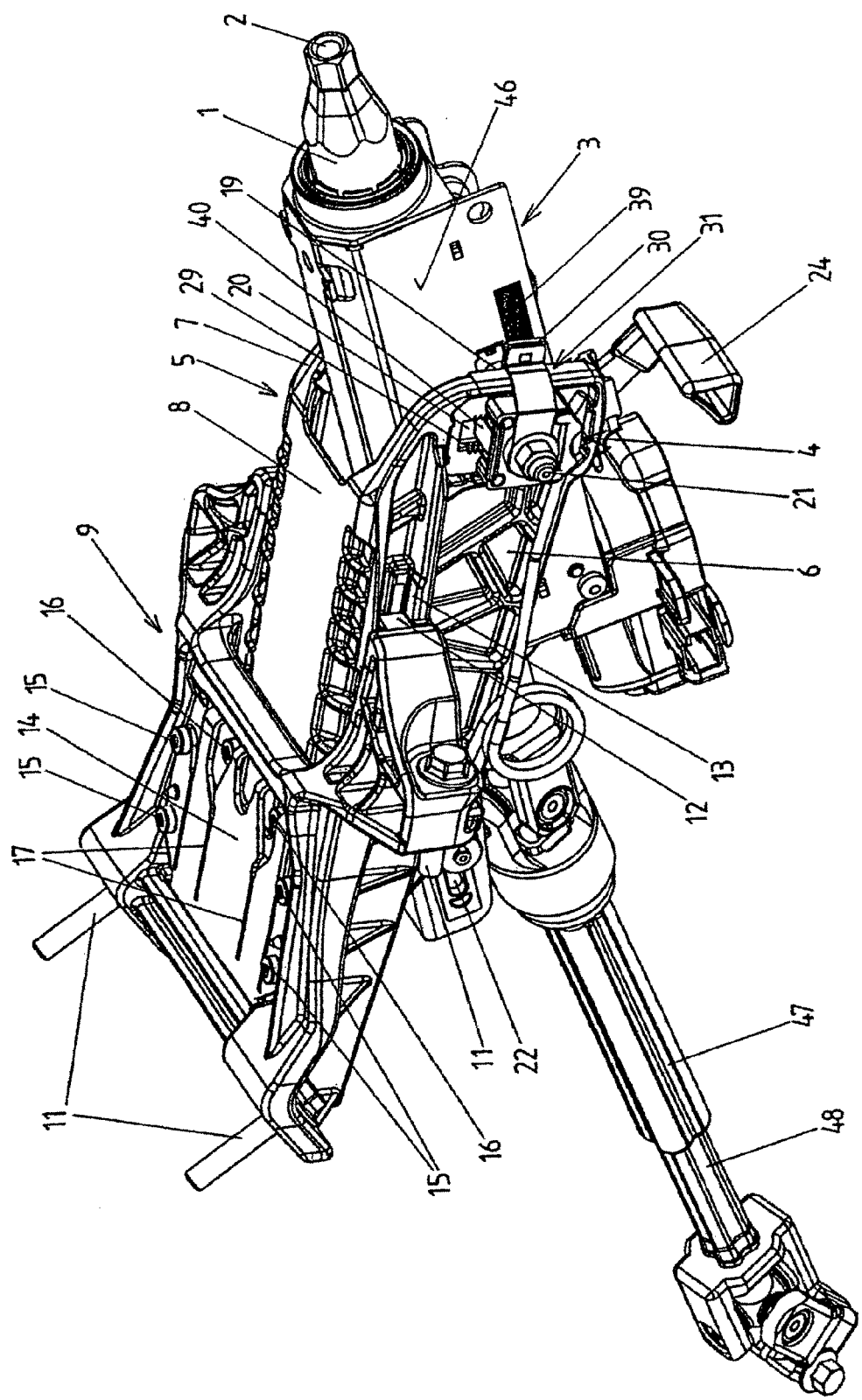
FIG. 1 an oblique view of an embodiment example of a steering column according to the invention, FIG. 2 a side view of the steering column of FIG. 1, FIG. 3 a side view of the steering column of FIG. 1 in the state after a crash, FIG. 4 an enlarged segment from FIG. 1, FIG. 5 an enlarged segment of the steering column in the region of the console in a slightly changed viewing direction compared to FIG. 1, FIG. 6 a portion of a section along line A-A of FIG. 2, FIG. 7 a section corresponding to FIG. 6 however in the opened state of the securement device, FIG. 8 a portion of a section along line B-B of FIG. 3, FIG. 9 an enlarged detail C of FIG. 7, FIG. 10 an enlarged detail D of FIG. 6, FIG. 11 an enlarged detail E of FIG. 8 (the console having been removed for the sake of clarity), FIG. 12 a section corresponding to FIG. 11 in a slightly modified state after the crash, FIG. 13 an oblique view of the support arm with the clamping wedge fastened thereon, FIG. 14 an enlarged detail of FIG. 10, FIG. 15 a modified embodiment of the locating face for the clamping wedge (in an oblique view analogous to FIG. 4), FIG. 16 a further slightly modified embodiment variant of the invention (in a section corresponding to FIG. 10), FIG. 17 the support arm with attached bearing according to this embodiment in oblique view.

An embodiment example of a steering column according to the invention, which is adjustable in the axial direction in height or inclination, is depicted in the Figures. The steering spindle 1 is rotatably supported in a section adjacent to the steering wheel-side end 2 of the steering column in a setting part 3 which encompasses the steering spindle 1 in this section. The setting part 3 in the opened state of a securement device 4 is settable with respect to a holding part 5 supporting the setting part 3 in the axial direction of the steering column and in height or in inclination, whereby the position of a steering wheel (not shown) disposed on the steering wheel-side end 2 of the steering spindle 1 is settable accordingly.

The setting part 3 of an adjustable steering column of the type such as is depicted in the Figures, is also referred to as shell tube or guide box.

Figure 2:
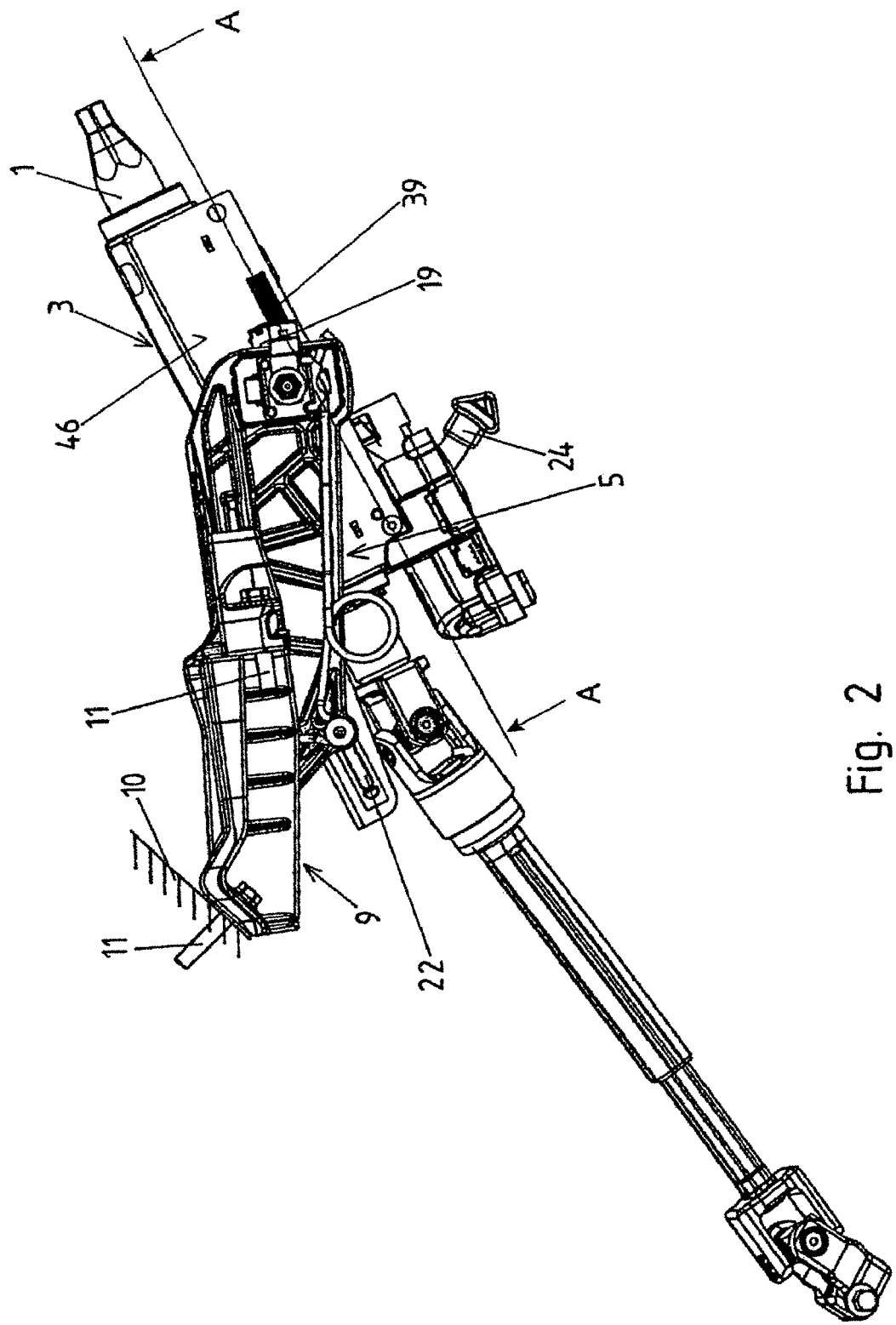

In cross section the holding part 5 is implemented in the form of a U and includes side jaws 6, 7 extending on both sides of the setting part 3 and connected by a connection shank 8. The holding part 5 is connected via a console 9 with the chassis 10 of the motor vehicle, which is only indicated schematically in FIG. 2 and 3 in one place. The chassis-stationary console 9 is fastened by means of bolts 11 on the chassis.

Figure 5:
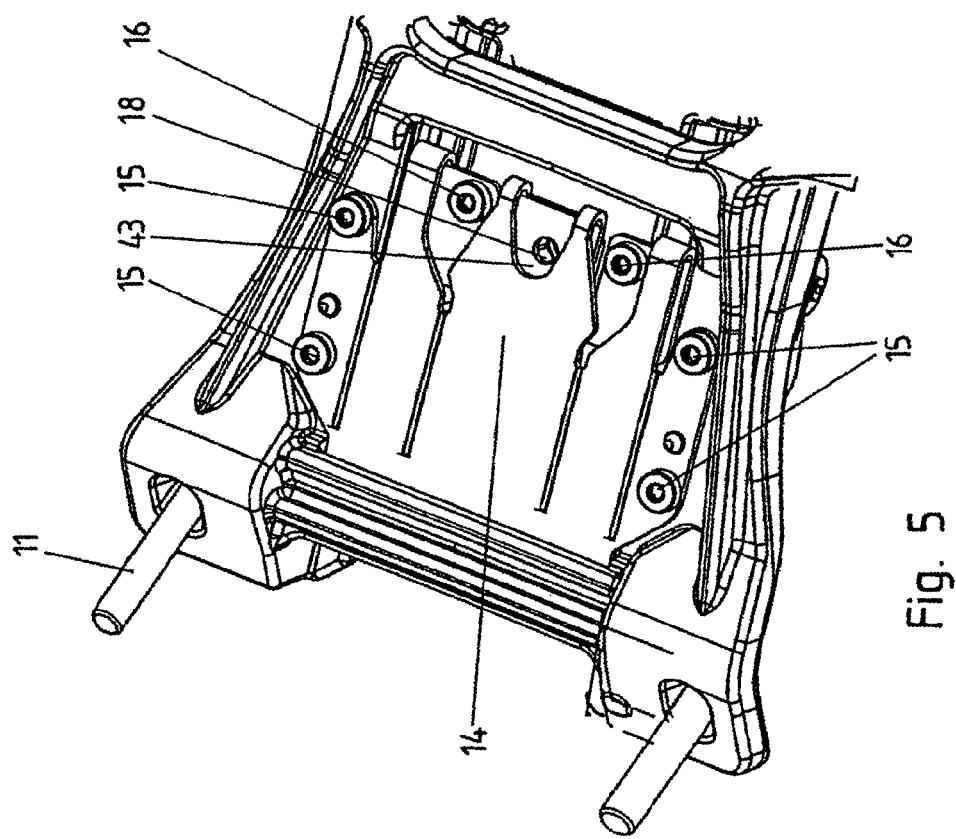

In normal operation the holding part 5 is also stationary on the chassis. In the event of a crash, dislocation of the holding part 5 with respect to the console 9 is possible, wherein energy is absorbed. For this purpose clamping shoes 12 of the console 9 extend on both sides of the holding part 5 into clamping guides 13 of holding part 5. In the depicted embodiment example the clamping shoes 12 are implemented in the form of projecting clamping noses, which engage into the clamping guides 13 developed in the form of grooves forming the clamping. For example through an appropriate prestress, the clamping force, and therewith the break-away force, is therein preset. In the event of a crash the clamping force exerted by the clamping shoes 12 can be overcome, whereby the holding part 5 can be dislocated in the manner of a sled with respect to the console 9 in the direction toward the motor vehicle front wherein energy is absorbed through friction between the clamping shoes 12 and the clamping guides 13, and, if necessary, also deformation and removal of material of the clamping guide 13 and/or of the clamping shoes 12. The clamping guides 13 may also be provided with a contour which allows the clamping force to increase progressively during the dislocation of the holding part 5 with respect to the console 9. For the energy absorption during the dislocation of the holding part 5 with respect to console 9 in the event of a crash, furthermore at least one bent strip 14 is available, which is developed in the form of a U and is fastened with its first U-leg via fastening bolts 15 on the console 9 and with its second U leg via fastening bolts 16 on holding part 5. With the dislocation of holding part 5 relative to console 9, consequently bending work is performed on the bent strip 14. The bent strip 14, furthermore, is provided with notching 17, along which it can tear open during the dislocation of the holding part 5 with respect to console 9, whereby further energy absorption takes place. A locking bolt 18 (FIG. 5) may additionally be provided which can be extended out of the holding part 5 and subsequently projects into a cutout 43 in the leg of the bent strip 14 fastened on console 9. For the dislocation of the holding part 5 with respect to console 9, in this case the bent strip 14 can be torn open by the extended locking bolt 18. The dislocation of the holding part 5 with respect to the console 9 therefore requires with the extended locking bolt 18 a greater force than when the locking bolt is retracted. The setting of the force level can in particular take place as a function of whether or not the driver is wearing a seat belt. If this is not the case, the greater force level is set. The displacement of the locking bolt 18 may take place for example in the event of a crash through pyrotechnical means.

It would also be conceivable and feasible to omit the bent strip 14 and to have the energy absorption only taking place via the clamping shoes 12 guided in the clamping guides 13. The energy absorption could essentially also take place only via one or several bent strips.

In setting part 3 and in holding part 5 intersecting elongated holes are disposed, through which penetrate clamp bolts 21 of the securement device 4, such that the displacement of the setting part 3 with respect to the holding part 5 in both setting directions (length displacement and height or inclination displacement) becomes possible. In setting part 3 an elongated hole 19 is available extending through it in the axial direction of the steering column or steering spindle, of which hole in FIG. 1 only a margin-side section is visible. In the side jaws 6, 7 of holding part 5 an elongated hole 20 each extending in the direction of the height displacement is available. Furthermore is available on the end of setting part 3 facing the vehicle front an elongated hole 20 extending in the axial direction of the steering column or steering spindle. This hole is penetrated by a bolt disposed on holding part 5, which forms the pivot axis for the height or inclination adjustment of the steering column.

The securement device 4 comprises the clamp bolt 21, already described, which in the depicted embodiment example during the opening and closing of the securement device is displaced in its axial direction. For this purpose in conventional manner a clamp plate 23 is available (cf. for example FIG. 6), which can be swivelled by a clamping lever 24 about the longitudinal axis 25 of clamp bolt 21. The clamp plate 23 is disposed on the clamp bolt 21 or implemented integrally with it. The clamp plate 23 comprises for example a clamp cam 26, which cooperates with an oblique face of a counterpressure plate 27. During the swivelling of the clamping lever 24 from its position in the opened state of the securement device in the direction of its closed position, clamp plate 23 is pressed away from the counterpressure plate 27, whereby the clamp bolt 21 is displaced in its axial direction. A securement element 28 in the form of a clamp jaw disposed on the side of the setting part 3 opposite the clamping lever 24 and stayed by a nut 44 screwed onto the end side onto clamp bolt 21 is pulled against the force of a spring in the direction toward the side jaw 7 of holding part 5. Hereby toothings 45 of the securement element 28 (cf. FIGS. 7 and 9) are brought into engagement with toothings 29 of the side jaw 6, whereby a positive locking of the height adjustment is attained. Frictional faces of the side jaws 6, 7 are furthermore pressed against the side faces 46 of setting part 3, whereby a frictional closure locking of the length adjustment of the steering column is attained.

On counterpressure plate 27 toothings may also be disposed, which, in the closed state of the securement device, engage toothings on side jaw 7 and, in the opened state of the securement device, are raised from them through the force of a spring.

Securement devices, in which the clamp bolt during the opening and closing is displaced in the axial direction, are known in different embodiments. The invention is not limited to the depicted and described implementation of the securement device. For example, the securement in place of the length adjustment of the steering column could also take place through positive locking through meshing toothings.

The implementation of the securement device could herein correspond for example to that of the cited EP 0 836 981 B1. For the securement of the height or inclination adjustment and/or of the axial adjustment of the steering column, lamellae clampable with one another in the manner of a lamella stack could also be provided as securement elements. The implementation could herein correspond for example to the above cited EP 0 802 104 B1.

The mechanism for the manual or motor axial displacement of the clamp bolt during the opening and closing can also be developed in different manner. For example on the clamp plate, instead of clamp cams, clamp rollers could also be disposed.

In the embodiment examples described so far the clamp bolt 21 is axially displaced during the opening and closing of the securement device and, in its axial displacement, entrains the securement element 28, wherein the securement element 28 comes into engagement with a further securement element which is here formed by the toothings 29 of the side jaw 6. The invention can also be incorporated into securement devices in which the clamp bolt is not disposed such that it is axially displaceable and securement elements are disposed such that they are displaceable independently of the clamp bolt. The securement device may in particular also comprise electrically or hydraulically drivable securement elements whose displacement does not absolutely have to take place in the direction of the axis of a clamp bolt. The clamp bolt may also serve only as a displacement axis for corresponding securement elements, for example a clamp jaw. The clamp bolt can therein also be implemented as a multipart bolt and be disposed on both sides on the side of the setting part 3 facing away from the steering spindle 1.

Figure 13:
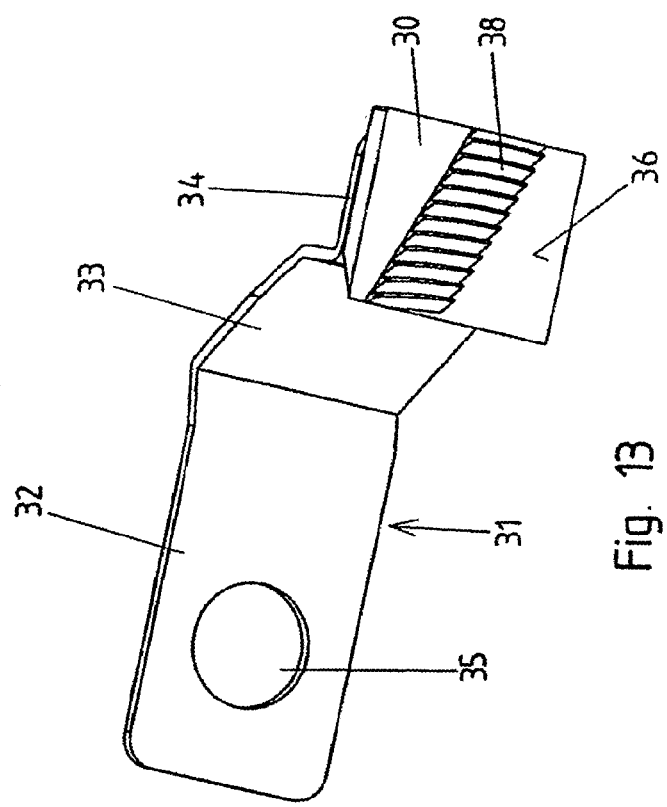

To be able to exert in the event of a crash an additional holding force against a length adjustment of the steering column, a crash blocking means is available, which comprises a clamping wedge 30. This wedge is disposed on a support arm 31 implemented of an elastically flexible material, preferably spring steel. The support arm includes a first fastening section 32, a connection section 33 and a second fastening section 34, on which the clamping wedge 30 is fastened, preferably swaged, riveted or welded (cf. in particular FIG. 13). The first fastening section 32 has a bore 35, with which the support arm 31 is placed onto the clamp bolt 21, wherein it is disposed on the side of the securement element 28 facing away from the steering spindle 1 and, for example, is welded to it or connected with it through guide projections such that it is nonrotatable about the longitudinal axis 25 of the clamp bolt 21. The support arm 31 is consequently also displaced in the direction of the longitudinal axis 25 of clamp bolt 21 during an axial displacement of the securement element 28 during the opening and closing of the securement device.

Between the first fastening section 32 of support arm 31 and the nut 44 a washer 49 is disposed, which may also be implemented in the form of a roller bearing, in particular needle bearing (and consequently comprises first and second bearing shells with rolling bodies located between them in a cage).

Other fastenings of the support arm 31 on parts of the securement device moving during the opening and closing of the securement device are also conceivable and feasible for the support arm 31. For example, the support arm 31 could be employed between two nuts screwed toward the end onto the clamp bolt 21 or be welded frontally onto a head of the clamp bolt.

Figure 6:
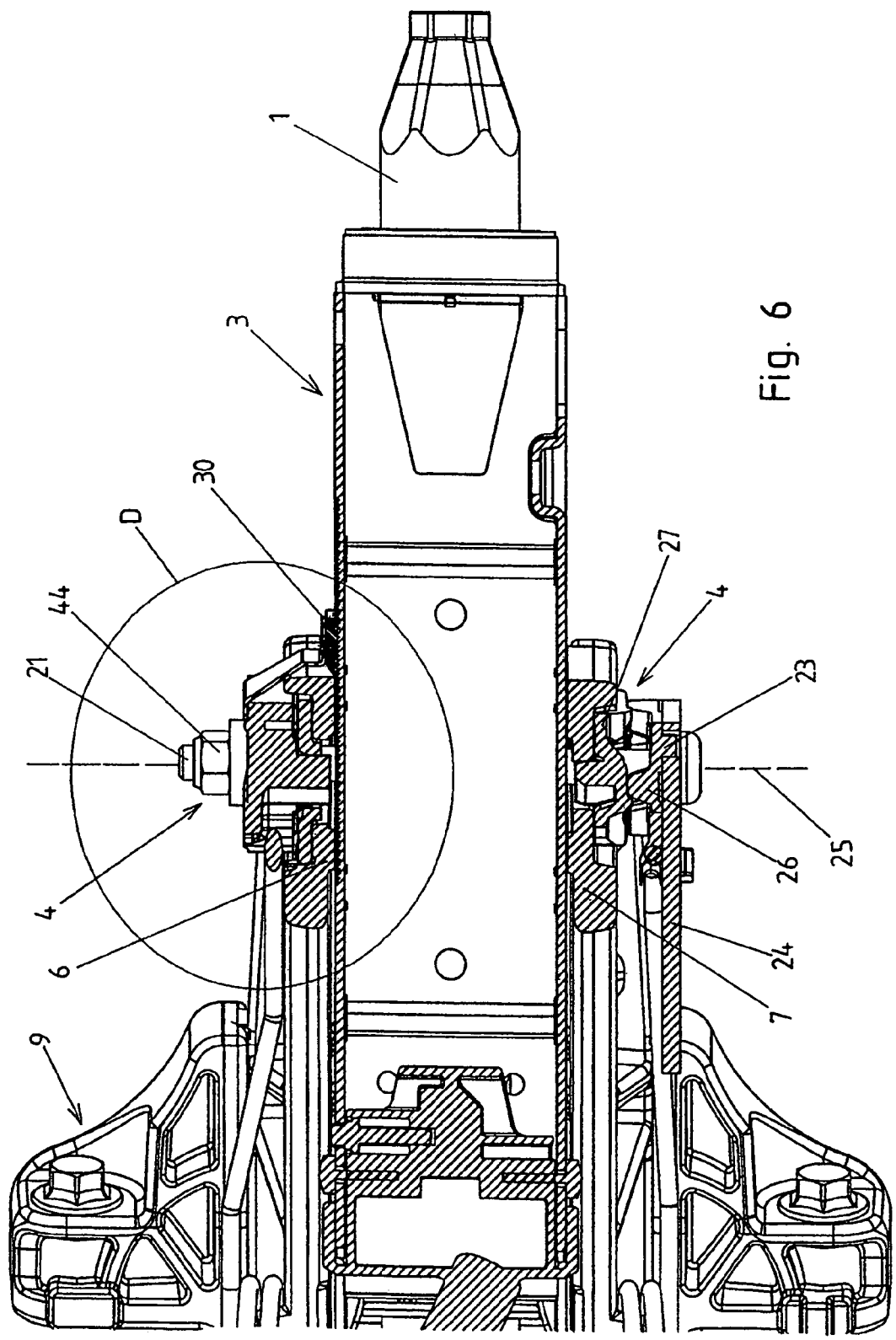
Figure 10:
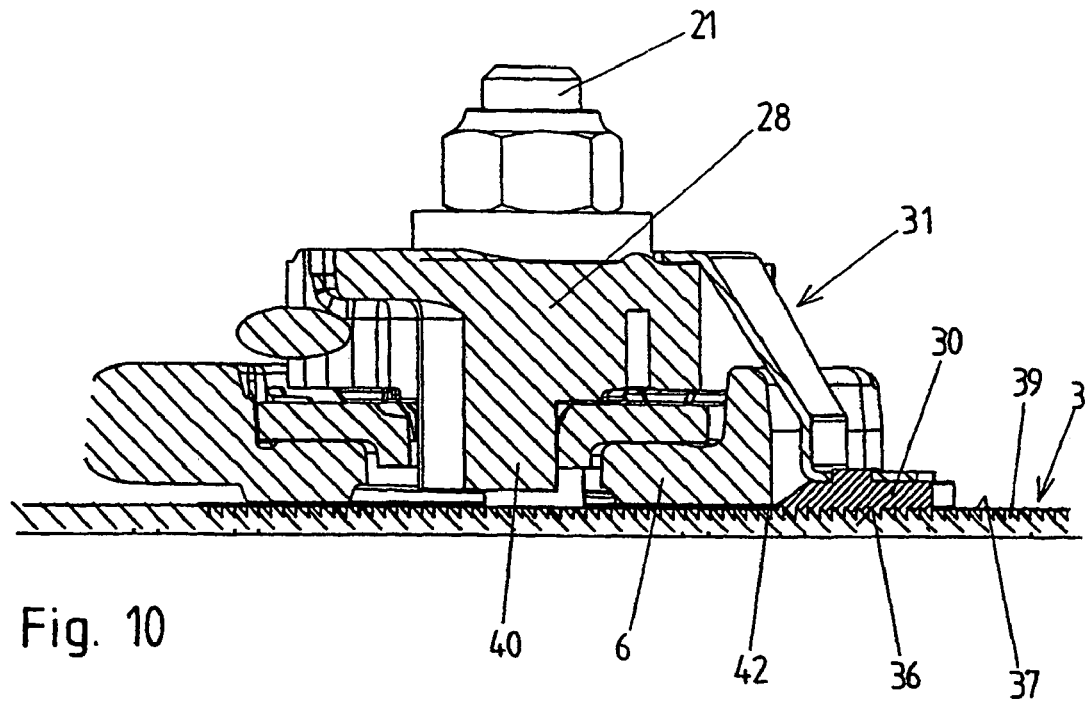

In the closed state of the securement device the clamping wedge 30 is in contact with a contact face 36 on a locating face 37 of setting part 3, as is evident in particular in FIG. 6 and 10. In the depicted embodiment example on the contact face 36 of the clamping wedge 30 and on the locating face 37 of setting part 3 toothings 38, 39 are disposed, which, in the state of the clamping wedge 30 in which it is in contact on locating face 37, mesh with one another.

Since in the depicted embodiment example the support arm 31 is connected nonswivellably with the clamp jaw 28 and the latter, due to a guide nose 40 engaging into the elongated hole 20 in side jaw 6, is nonswivellable relative to the side jaw 6 and the setting part 3 during a height or inclination displacement is swivelled relative to the holding part 5, the combs of the toothings 38, 39 are curved in the form of a circular arc about the swivel axis of setting part 3, about which the setting part 3 is swivelled during its height displacement. The width of the toothing 39 is herein such that the toothing 38 comes into engagement with it at all swivel positions of setting part 3.

It would also be conceivable and feasible to guide the support arm 31 such that it is nonswivellable with respect to the setting part 3, such that during a height or inclination adjustment of the steering column it is swivelled with respect to the clamp bolt 21 and the clamp jaw 28. However, in this implementation the support arm 31, as before, is entrained in the axial direction during an axial displacement of the clamp bolt 21 and of the clamp jaw 28.

However, it is furthermore also conceivable and feasible to guide the support arm 31 such that during the displacement it carries out a movement relative to the holding part 5 as well as also relative to the setting part 3, the range of which is restricted in this respect through appropriate measures such as stop guides such that a reliable engagement of the toothing 38 of clamping wedge 30 and of toothing 39 of locating face 37 remains ensured during the closing of the securement device. In very simple manner the clamping wedge 30 can be guided by a face of the side jaw 6 of holding part 5. The steering wheel-side end face of the side jaw can herein serve as a guide face (FIG. 9).

Figure 7:
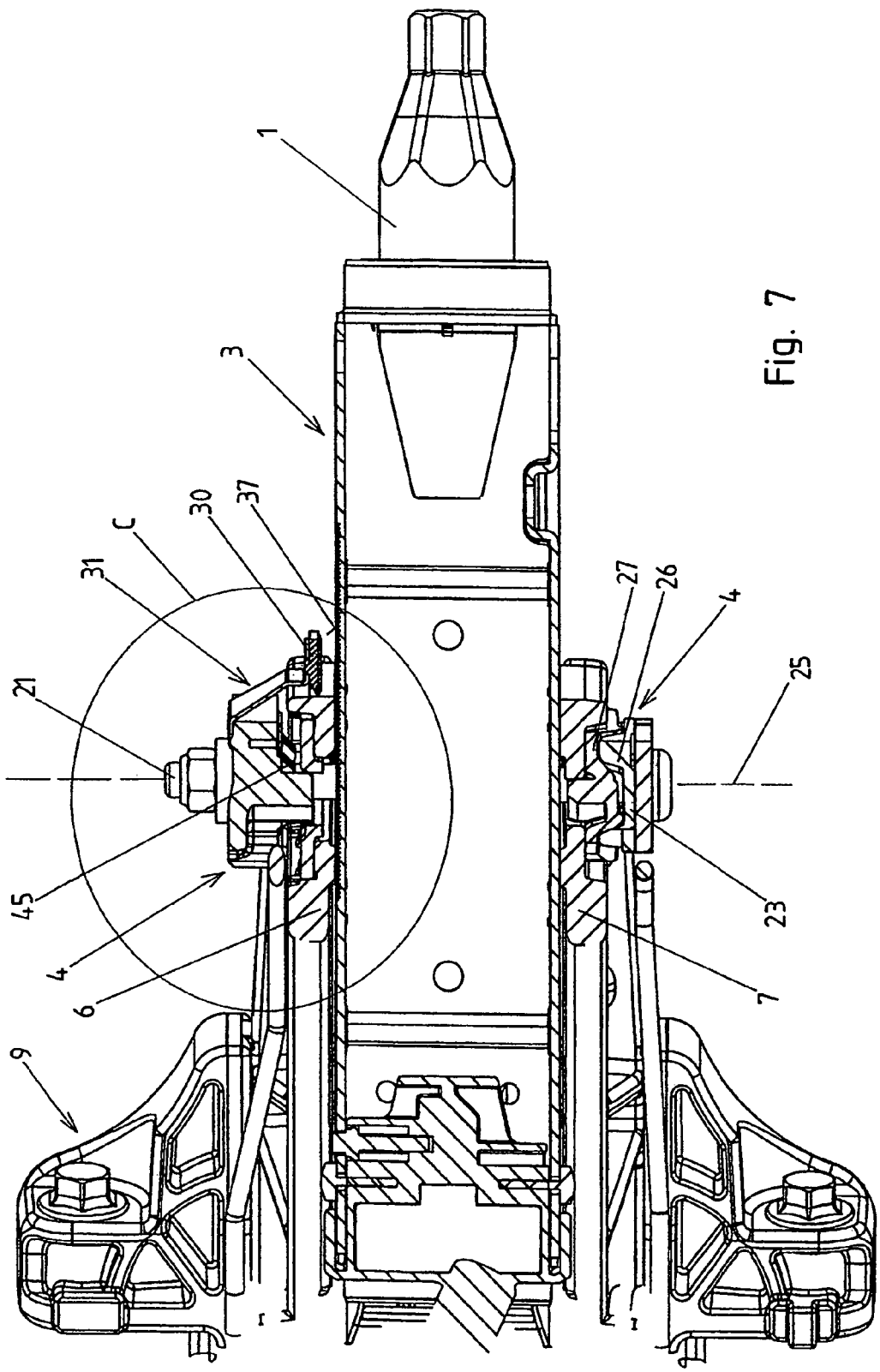
Figure 9:
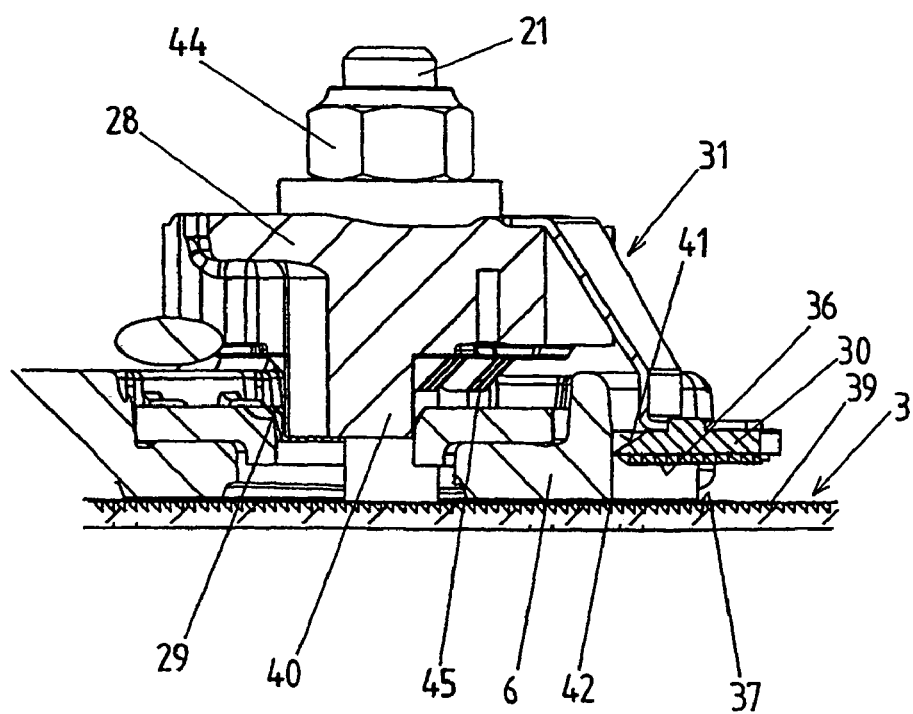

In the opened state of the securement device, the contact face 36 of clamping wedge 30 is raised from the locating face 37 of setting part 3, as is evident in particular in FIGS. 7 and 9. When the securement device is being closed, the clamp bolt 21 is axially displaced, wherein the clamp jaw 28 is pulled in the direction toward the side jaw 6 and brought into engagement with its toothings 45 with the toothings 29 of side jaw 6. During this displacement of clamp jaw 28 the support arm 31, and with it the clamping wedge 30, is correspondingly displaced such that the toothing 38 of clamping wedge 30 is brought into engagement with the toothing 39 on locating face 37, as is evident in FIG. 10.

If, in the event of a crash, the holding force of the securement device is insufficient to prevent a length displacement of the steering column, wherein through the impact of the driver on the steering wheel or by triggering the air bag a dislocation of setting part 3 in the direction toward the vehicle front commences, the clamping wedge 30 is entrained with the setting part 3 during this onsetting dislocation by the engagement of the toothings 38, 39 and with its wedge tip, developed by the first wedge face formed by the contact face 36 and the second wedge face 41 obliquely approximating the first wedge face, is slid into a gap, open toward the steering wheel-side end 2, between the setting part 3 and the side jaw 6 of holding part 5 and wedged into it after a short displacement path, definable by the structuring, of preferably less than 5 mm, such that a further displacement of the setting part 3 with respect to holding part 5 is blocked. Depending on the angle between the first wedge face and the second wedge face 41, a more positive locking (greater angle) or a more frictional-closure (smaller angle) force transmission may herein be involved.

An alternative embodiment provides allowing through the wedging of clamping wedge 30 a certain movement of setting part 3 with respect to holding part 5 under absorption of an energy quantity predetermined by the construction. Corresponding deformations occur therein in setting part 3 and/or in holding part 5. Thereby a further stage for crash systems acting in multiple stages can be developed, i.e. the energy absorption takes place in several stages or on several different structural parts.

Figure 3:
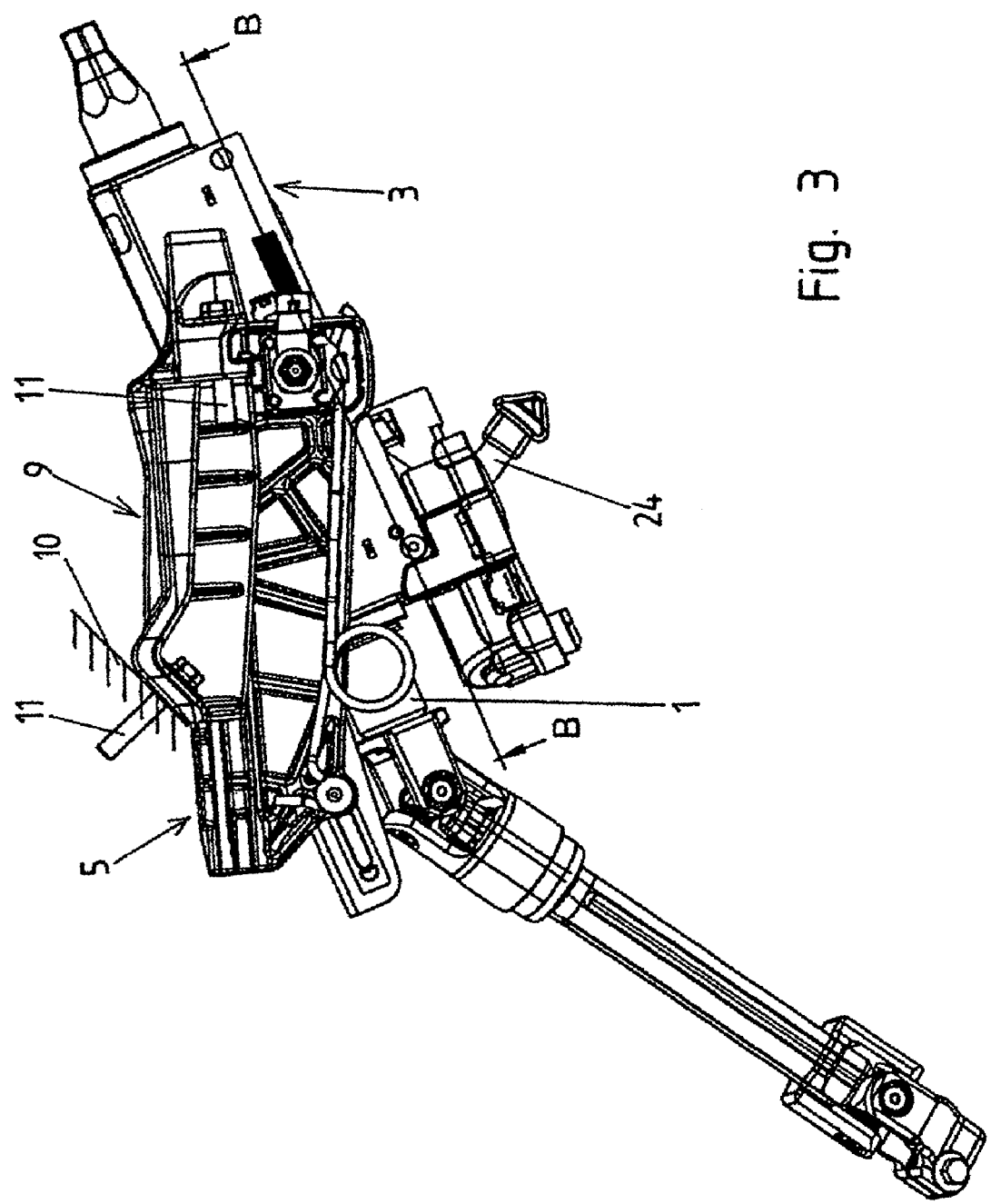
Figure 4:
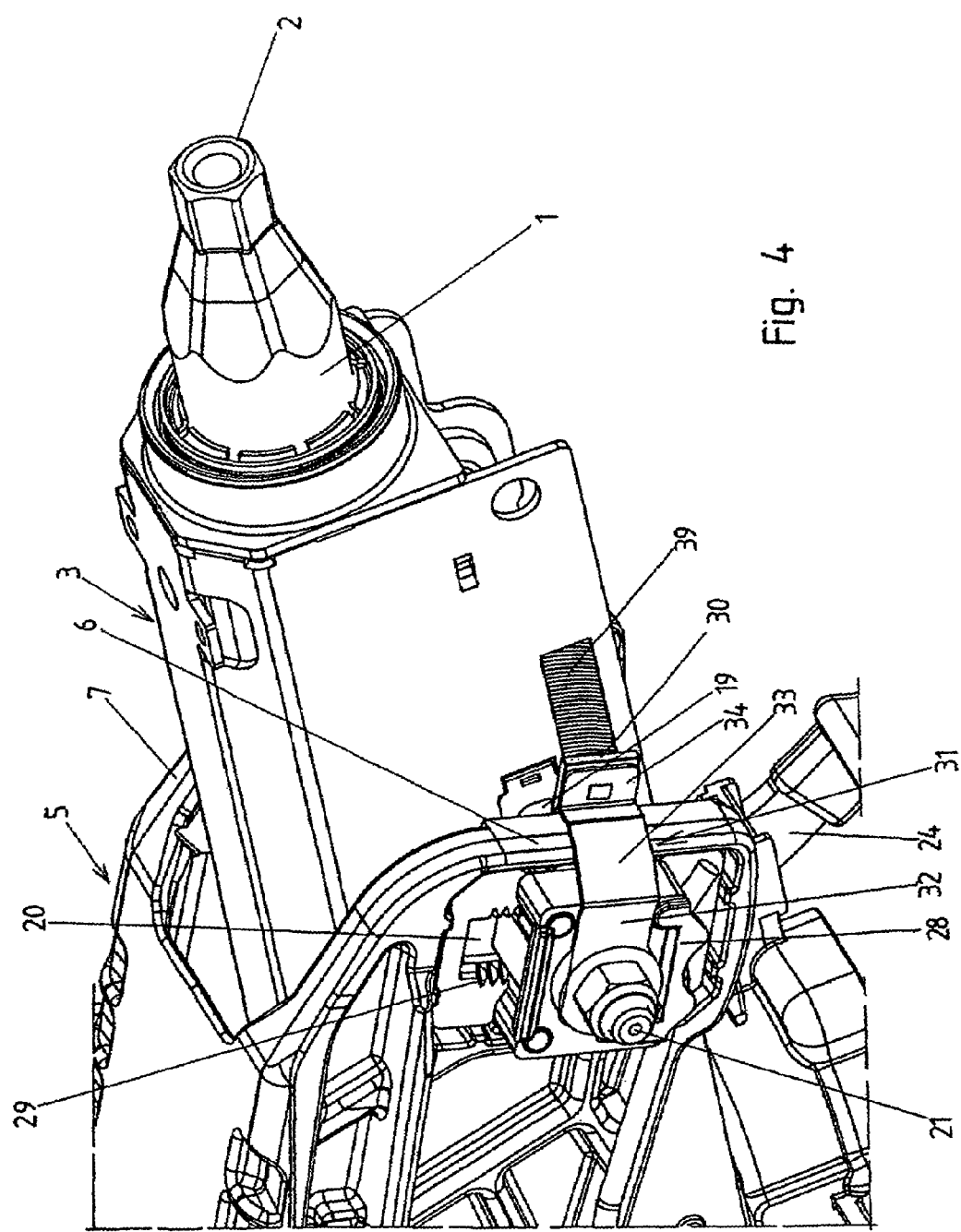
Figure 11:
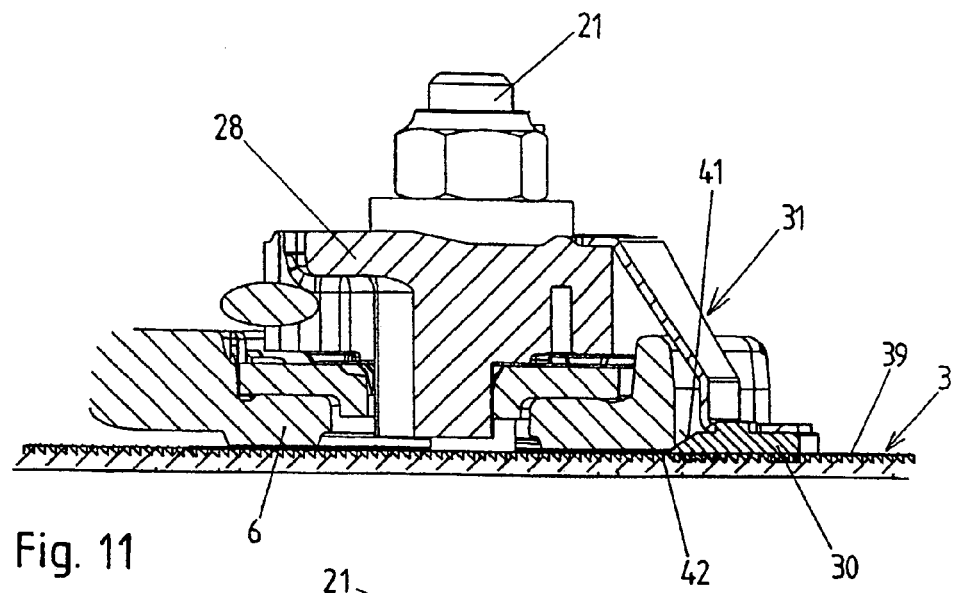
Figure 12:
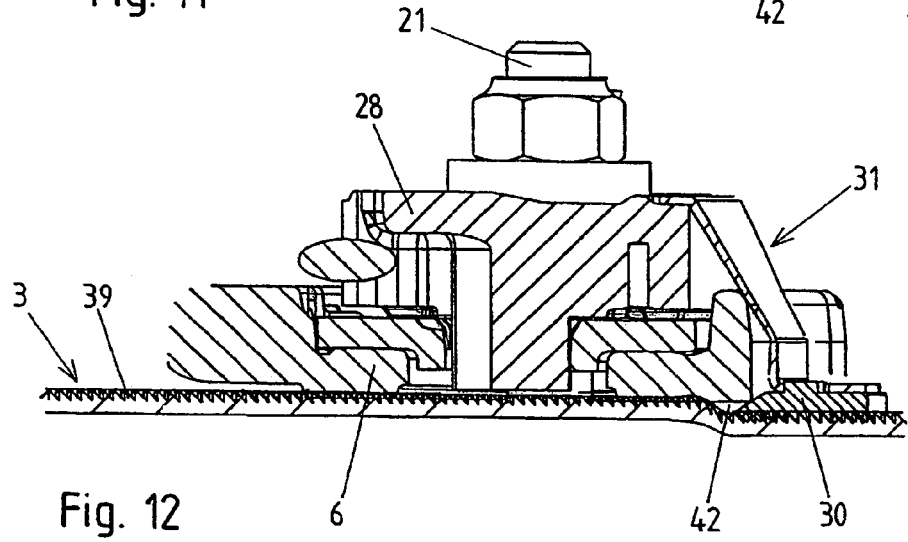
Figure 14:
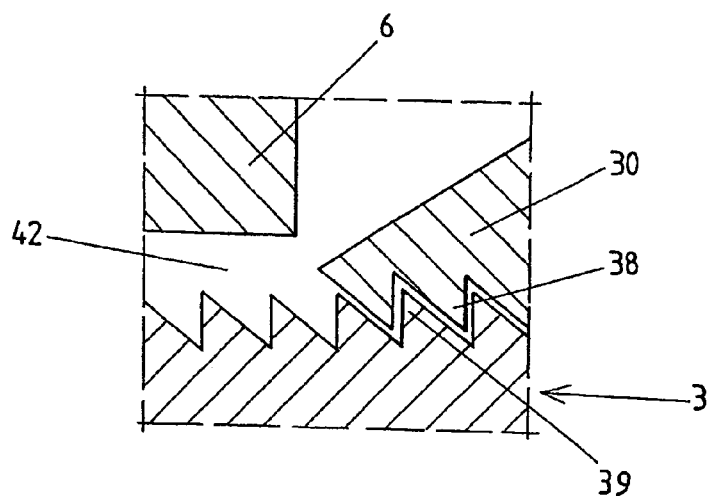

The steering column after the crash with the clamping wedge 30 wedged in gap 42 is depicted in FIGS. 3, 8 and 11. In FIGS. 3 and 8 the dislocation of holding part 5 with respect to the console 9 is also evident, wherein two sections 47, 48 (cf. FIG. 1) telescopable one into the other of the steering spindle 1 are slid together. FIG. 12 shows a slightly modified depiction of the condition after the crash. Setting part 3 is here deformed in the direction of an enlargement of gap 42, and specifically due to the severity of the impact and/or due to the deformable implementation of setting part 3 in the proximity of its locating face 37. The deformation is depicted in exaggerated form in FIG. 12.

Figure 15:
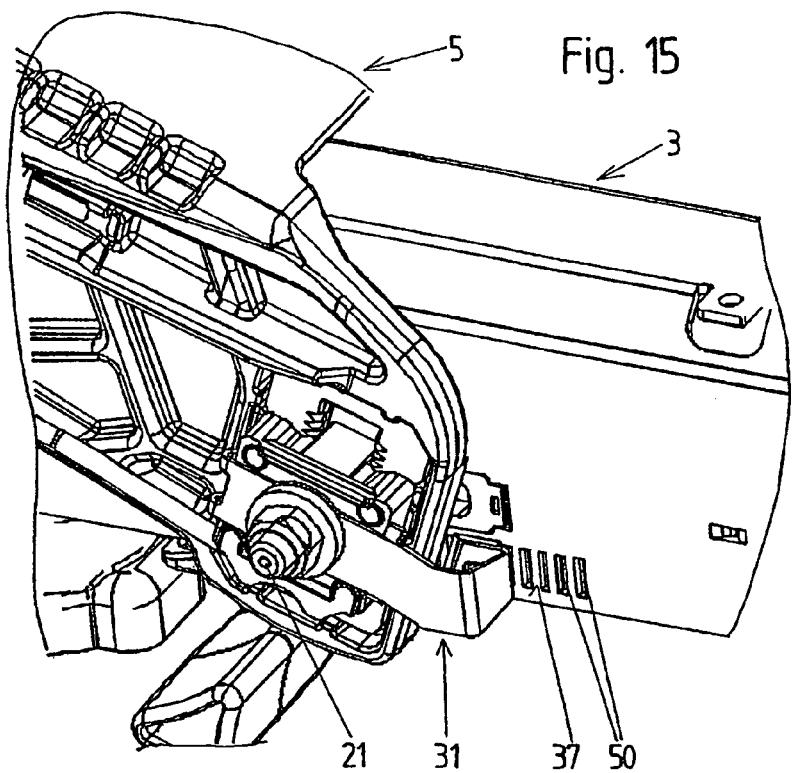

Instead of toothings, other positive-locking connections between contact face 36 of clamping wedge 30 and locating face 37 of setting part 3 may also be provided. Contact face 36 and locating face 37 of setting part 3 may here also have different profilings, which ensure a sufficient positive closure for entraining the clamping wedge 30 in the event of a crash. Profilings can in particular also be utilized, which can readily be applied in the side face 46 of setting part 3 by rolling or plastic deformation techniques. In an advantageous embodiment punched holes may herein be involved. In FIG. 15 such an embodiment is depicted, in which the locating face 37 of setting part 3 is provided with slit-form punch-outs 50 with which the contact face 36 of clamping wedge 30 cooperates, which, in turn, is preferably provided with toothings.

Instead of a positive-locking connection between the clamping wedge 30 and locating face 37 of setting part 3, or in addition to it, it would also be conceivable and feasible to develop a frictional-closure connection between contact face 36 of clamping wedge 30 and locating face 37 of setting part 3 in the closed state of the securement device, thereby that the clamping wedge 30 in the closed state of the securement device is pressed onto the locating face 37 of setting part 3. For this purpose on the contact face 36 and on locating face 37 materials would need to be provided with a sufficient mutual friction as well as sufficient press-on force such that clamping wedge 30 at the onsetting dislocation of setting part 3 is entrained by it in the event of a crash.

During the entrainment of clamping wedge 30 in the event of a crash by the setting part 3 with the preferred elastic implementation of support arm 31, an elastic bending of the support arm occurs (plastic deformation of the support arm instead of such would also be conceivable and feasible). Through the elasticity of the support arm a sufficient press-on force of contact face 36 on locating face 37 could also be applied in the closed state of the securement device 4 and tolerances could be accepted. Through the elasticity of the support arm 31 furthermore the securement device 4 can also be closed with only minimally increased force expenditure even if a so-called tooth-on-tooth position between toothings 38, 39 occurs, i.e. when the tips of their teeth are in contact on one another. The complete engagement between the toothings 38, 39 in this case occurs in the event of a crash during the onsetting dislocation of setting part 3.

In order to ensure the engagement of the toothings 38 and 39 at all times, a locating face could also be provided on side jaw 6, which presses the support arm 31 shortly before the complete lowering of clamping wedge 30, for example at a distance of the contact face 36 of clamping wedge 30 from the locating face 37 of holding part 3 of the 0.5-fold to the 0.9-fold of the depth of the toothing of the toothings 38 and 39 with respect to one another, in the direction of the steering wheel-side end 2 of the steering spindle. The length of this movement can remain limited for example to the 1.5-fold of the tooth widths of toothings 38 and 39. Through the spring action of the support arm such a displacement can also occur during the closing of the securement device, through which a tooth-on-tooth position is prevented.

To ensure a positive-locking engagement, two clamping wedges 30 may also be provided on both side jaws 6 and 7, wherein the tooth engagements are each disposed offset with respect to one another by one half tooth distance through the appropriate layout of the particular pairs of toothings 38 and 39.

The state of the clamping wedge 30 in which it is raised from the locating face 37 with the opened securement device 4 can also be referred to as "passive position" of the clamping wedge. The state of the clamping wedge 30 in which it is in contact on locating face 37 with the securement device closed can be referred to as "standby position" and the state of the clamping wedge 30 in which it is wedged in gap 42 in the event of a crash can be referred to as "active position" of clamping wedge 30.

The clamping wedge 30 is preferably position-controlled in the event of a crash, wherein it is entrained by the dislocation of setting part 3 and is moved from its standby position into its active position.

In the above described embodiment variants of the invention the steering column in the event of a crash is blocked by the clamping wedge against any displacement, thus in the direction of axial displacement as well as also in the direction of height or inclination displacement. After the wedging of clamping wedge 30 the holding part 5 and the setting part 3 are sufficiently firmly fixed with one another.

Moreover, embodiment variants are also conceivable and feasible, in which the wedging of a clamping wedge 30 entrained during the axial displacement of the steering column cannot at all or not sufficiently block the height and/or inclination displacement. Blocking the height and/or inclination displacement can in this case be ensured through further measures, for example as described in the following.

In addition to the blocking of the length displacement of the steering column through the clamping wedge in the event of a crash, or instead of this blocking of the length displacement, blocking of the height displacement (or inclination displacement) could in an invented steering column in the event of a crash take place through an additional or differently disposed clamping wedge. The height displacement of the steering column should in the event of a crash as much as possible not be displaced through forces acting during the crash onto the steering column. In order to block a displacement of the setting part 3 in the upward direction, a gap open in the downward direction could be provided between setting part 3 and holding part 5, into which the clamping wedge in the event of a crash is driven and in which it becomes wedged. The clamping wedge is herein again connected via a support arm with the clamp bolt or a part jointly moving axially with it, and in the closed state of the securement device comes into contact on the setting part 3 and, at the onsetting dislocation of setting part 3, in the event of a crash is entrained by it and driven into the gap. Analogously, a displacement of setting part 3 downwardly could be blocked in the event of a crash.

In another embodiment example of the invention the steering column could for example also comprise a shell tube rotatably supporting the steering spindle, which is supported displaceably in the longitudinal direction of the steering column in a guide track, which, in turn, is disposed such that it is swivellable on a mounting part connected with the chassis (as also described in the above cited U.S. Pat. No. 6,581,965 B2). If a crash blocking means for the length displacement of this steering column is to be provided, the shell tube could be viewed as the setting part and the guide track as the holding part within the scope of the invention. If a blocking means for the height adjustment is to be provided, the guide track could be viewed as the setting part and the mounting part as the holding part within the scope of the invention.

Figure 16:
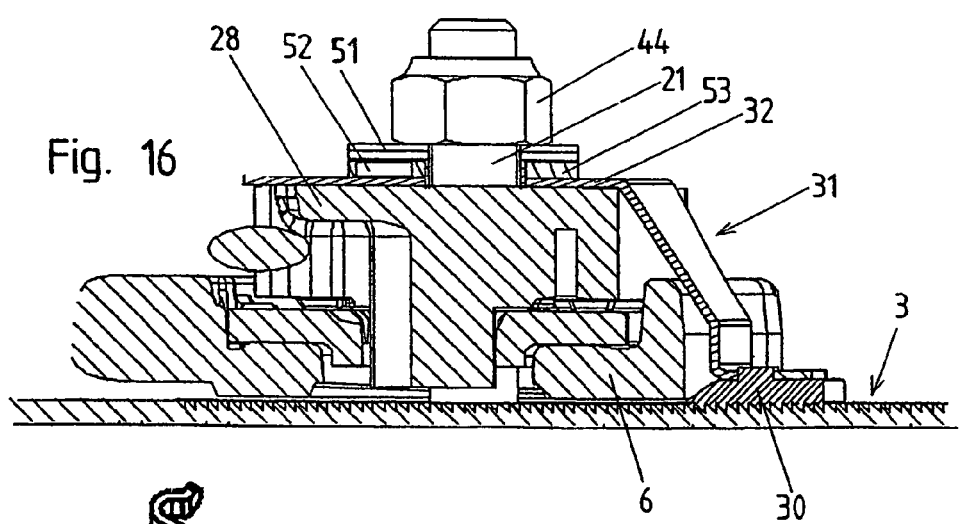
Figure 17:
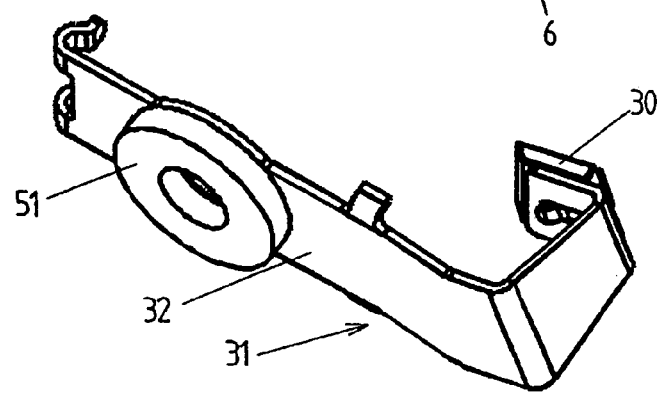

A further slightly modified embodiment is depicted in FIGS. 16 and 17. Here a roller bearing implemented in the form of a needle bearing is directly attached on the support arm. The first fastening section 32 of support arm 31 forms herein one of the bearing shells of the roller bearing. The roller bearing comprises furthermore a second bearing shell 51. Between the fastening section 32, forming the first bearing shell, of support arm 31 and the second bearing shell 51 are located rolling bodies 52, disposed in a cage 53. The structural length of the clamp bolt 21 can thereby be minimized.

LEGEND TO THE REFERENCE NUMBERS

1 Steering spindle
2 Steering wheel-side end
3 Setting part
4 Securement device
5 Holding part
6 Side jaw
7 Side jaw
8 Connection shank
9 Console
10 Chassis
11 Bolt
12 Clamp shoe
13 Clamp guide
14 Bent strip
15 Fastening bolt
16 Fastening bolt
17 Notching
18 Locking bolt
19 Elongated hole
20 Elongated hole
21 Clamp bolt
22 Elongated hole
23 Clamp plate
24 Clamping lever
25 Longitudinal axis
26 Clamp cam
27 Counterpressure plate
28 Securement element
29 Toothing
30 Clamping wedge
31 Support arm
32 First fastening section
33 Connection section
34 Second fastening section
35 Bore
36 Contact face
37 Locating face
38 Toothing
39 Toothing
40 Guide nose
41 Second wedge face
42 Gap
43 Cutout
44 Nut
45 Toothing
46 Side face
47 Section
48 Section
49 Washer
50 Punch-outs
51 Bearing shell
52 Rolling bodies
53 Cage

The invention claimed is:

1. Adjustable steering column for a motor vehicle comprising
   a setting part displaceable in at least one setting direction for setting the position of the steering column,
   a holding part nondisplaceable in this setting direction,
   a securement device in the opened state of which the setting part is displaceable with respect to the holding part for setting the position of the steering column and in the closed state of which the setting part is fixed in place by the securement device, and
   a crash blocking means by which in the event of a crash an additional holding force against a dislocation of the setting part with respect to the holding part can be exerted and which comprises a clamping wedge which, in the event of a crash, can be slid into a gap between the setting part and the holding part and can be wedged in it,
   wherein the clamping wedge is connected with a part of the securement device moving during the opening and closing of the securement device, such that during the closing of the securement device a contact face of the clamping wedge can be placed in contact on a locating face of the setting part and, in the closed state of the securement device is with the locating face of the setting part in positive locking and/or frictional closure contact, wherein the clamping wedge in the event of a crash can be entrained by the setting part at an onsetting dislocation of the setting part with respect to the holding part and can be wedged in the gap between the setting part and the holding part, and during the opening of the securement device the contact face of the clamping wedge can be raised from the locating face of the setting part.

2. Adjustable steering column as claimed in claim 1, wherein the clamping wedge is connected with a securement element of the securement device displaceable during the opening and closing of the securement device with respect to the setting part and/or holding part in a displacement direction and, in the closed state of the securement device, securing in place the setting part with respect to the holding part, such that it is nondisplaceable in the displacement direction of the securement element.

3. Adjustable steering column as claimed in claim 2, wherein the securement device comprises a clamp bolt, which during the opening and closing of the securement device is displaced in its axial direction and jointly with which the securement element moves during the opening and closing of the securement device.

4. Adjustable steering column as claimed in claim 1, wherein the clamping wedge is disposed on a support arm via which the clamping wedge is connected with the part of the securement device moving during the opening and closing of the securement device.

5. Adjustable steering column as claimed in claim 4, wherein the support arm is disposed on a securement element or on a part jointly moving with it during the opening and closing of the securement device into the displacement direction.

6. Adjustable steering column as claimed in claim 4, wherein the support arm comprises a first fastening section via which it is fastened on the part of the securement device moving during the opening and closing of the securement device, a second fastening section on which the clamping wedge is disposed, and a connection section.

7. Adjustable steering column as claimed in claim 6, wherein the securement element is formed by a clamp jaw disposed on the clamp bolt and the first fastening section of the support arm is disposed on the side of the clamp jaw facing away from a steering spindle.

8. Adjustable steering column as claimed in claim 7, wherein the fastening section of the support arm comprises a bore penetrated by the clamp bolt.

9. Adjustable steering column as claimed in claim 7, wherein the first fastening section is nonswivellably connected with the clamp jaw.

10. Adjustable steering column as claimed in claim 1, wherein on the contact face of the clamping wedge a toothing is disposed, which, in the state of the clamping wedge in which it is in contact on the locating face of the setting part, cooperates with a toothing disposed on the locating face or with punch-outs introduced in the locating face.

11. Adjustable steering column as claimed in claim 1, wherein the setting part rotatably supports the steering spindle and the holding part supports the setting part and is connected with a chassis of the motor vehicle.

12. Adjustable steering column as claimed in claim 1, wherein the steering column is displaceable in the axial direction and the clamping wedge in the event of a crash exerts an additional holding force against an axial displacement of the steering column, wherein the clamping wedge in the event of a crash can be entrained by the setting part in the axial direction of the steering column and the gap in which the clamping wedge is wedgeable in the event of a crash is open toward a steering wheel-side end of a steering spindle.

13. Adjustable steering column as claimed in claim 10, wherein the steering column is inclination-adjustable and the combs of the toothing of the contact face and of the toothing of the locating face extend in the form of a circular arc.

14. Adjustable steering column as claimed in claim 1, wherein the securement device comprises at least a securement element in the form of a clamp jaw comprising a toothing, which jaw is disposed on the clamp bolt and which, in the closed state of the securement device, engages into a toothing of the holding part.

15. Adjustable steering column as claimed in claim 1, wherein the setting part and the holding part comprise intersecting elongated holes which are penetrated by the clamp bolt, wherein the intersecting elongated holes are oriented, on the one hand, in the direction of the length displacement and, on the other hand, in the direction of the inclination or height displacement of the steering column.

16. Adjustable steering column as claimed in claim 11, wherein the holding part comprises at least one side jaw extending next to the setting part and the gap is located between the side jaw of the holding part and the setting part.

17. Adjustable steering column as claimed in claim 11, wherein the connection of the holding part with the chassis of the motor vehicle is established via a chassis-stationary console, wherein the holding part in the event of a crash is dislocatable in the direction toward the vehicle front with respect to the console with the absorption of energy.

18. Adjustable steering column as claimed in claim 17, wherein on the holding part clamp guides are disposed into which the guide shoes of the console engage forming a clamping.

19. Adjustable steering column as claimed in claim 17, wherein during the dislocation of the holding part with respect to the console a bending and preferably also a tearing-open of a bent strip takes place.

20. Adjustable steering column as claimed in claim 4, wherein the support arm is implemented such that it is elastically bendable.

21. Adjustable steering column as claimed in claim 1, wherein the contact face of the clamping wedge is formed by one of the two wedge faces of the clamping wedge.

* * * * *